US008704969B2

(12) United States Patent
Kim et al.

(10) Patent No.: US 8,704,969 B2
(45) Date of Patent: Apr. 22, 2014

(54) DISPLAY DEVICE HAVING LIQUID CRYSTAL DISPLAY COVER

(75) Inventors: Jae-Hyun Kim, Yongin (KR); Jae-Ik Lim, Yongin (KR); Yong-Seok Yeo, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 122 days.

(21) Appl. No.: 13/137,973

(22) Filed: Sep. 22, 2011

(65) Prior Publication Data

US 2012/0147297 A1 Jun. 14, 2012

(30) Foreign Application Priority Data

Dec. 13, 2010 (KR) .................. 10-2010-0126947

(51) Int. Cl.
*G02F 1/1333* (2006.01)

(52) U.S. Cl.
USPC ............................................. 349/58

(58) Field of Classification Search
USPC ............................................. 349/58
See application file for complete search history.

(56) References Cited

U.S. PATENT DOCUMENTS

| 4,838,660 | A | * | 6/1989 | Fergason | 349/90 |
| 4,844,596 | A | * | 7/1989 | Fergason | 349/90 |
| 4,850,678 | A | * | 7/1989 | Fergason | 349/86 |
| 6,970,210 | B2 | * | 11/2005 | Kim et al. | 349/58 |
| 7,079,119 | B2 | * | 7/2006 | Hanson et al. | 345/175 |
| 7,167,222 | B2 | * | 1/2007 | Inoue et al. | 349/112 |
| 7,768,596 | B2 | * | 8/2010 | You | 349/73 |
| 7,864,268 | B2 | * | 1/2011 | Egi et al. | 349/96 |
| 8,049,850 | B2 | * | 11/2011 | Sugiyama et al. | 349/118 |

FOREIGN PATENT DOCUMENTS

| KR | 10-2004-0078423 A | 9/2004 |
| KR | 10-2009-0035667 A | 4/2009 |
| KR | 10-2010-0025890 A | 3/2010 |

* cited by examiner

*Primary Examiner* — James Dudek
(74) *Attorney, Agent, or Firm* — Lee & Morse, P.C.

(57) ABSTRACT

A display device includes a main display unit and a liquid crystal display cover coupled with the main display unit. The liquid crystal display cover is movable between open and closed positions with respect to the main display unit. The liquid crystal display cover includes a lower substrate, an upper substrate, and a liquid crystal layer. The lower substrate includes a plurality of first pixels thereon. The upper substrate faces the lower substrate and has a first common electrode thereon. The liquid crystal layer is between the lower substrate and the upper substrate.

8 Claims, 7 Drawing Sheets

DISPLAY DEVICE HAVING LIQUID CRYSTAL DISPLAY COVER

CROSS-REFERENCE TO RELATED APPLICATION

This application claims priority to and the benefit of Korean Patent Application No. 10-2010-0126947, filed on Dec. 13, 2010, in the Korean Intellectual Property Office, and entitled: "Display Device Having Liquid Crystal Display Cover," the entire content of which is incorporated herein by reference.

BACKGROUND

1. Field

Embodiments relate to a display device having a liquid crystal display cover.

2. Description of the Related Art

Recently, due to development of communication technology such as wireless internet, portable electronic devices, e.g., laptop computers, that can are adapted for outdoor environments are being widely used.

SUMMARY

Embodiments may be realized by providing a display device with a liquid crystal display cover including a main display unit and a liquid crystal display cover coupled with the main display unit to be open and closed. The liquid crystal display includes a lower substrate on which a plurality of first pixels are formed, an upper substrate on which a first common electrode is formed and facing the lower substrate, and a liquid crystal layer disposed between the lower substrate and the upper substrate.

Moreover, the liquid crystal layer may be a polymer dispersed liquid crystal layer.

The liquid crystal layer may be a liquid crystal layer including a liquid crystal microcapsule.

The microcapsule may have a diameter of about 0.2 micrometers to about 80 micrometers.

The main display unit may be a liquid crystal display on which a polarizer is installed in a normally white mode.

The polarizer may include an anti-reflection (AR) layer formed thereon or an anti-glare (AG) layer.

The display device may further include a touch screen unit attached to a side of the liquid crystal display cover.

The display device may further include a pivot unit for connecting the main display to the liquid crystal display cover and allowing the liquid crystal display cover to pivot.

Embodiments may also be realized by providing a display device having a liquid crystal display cover that is movable with respect to a display unit such that in a closed configuration the liquid crystal display cover may both protect the display device from external shock and allow a user to see an image that is displayed on a main display.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
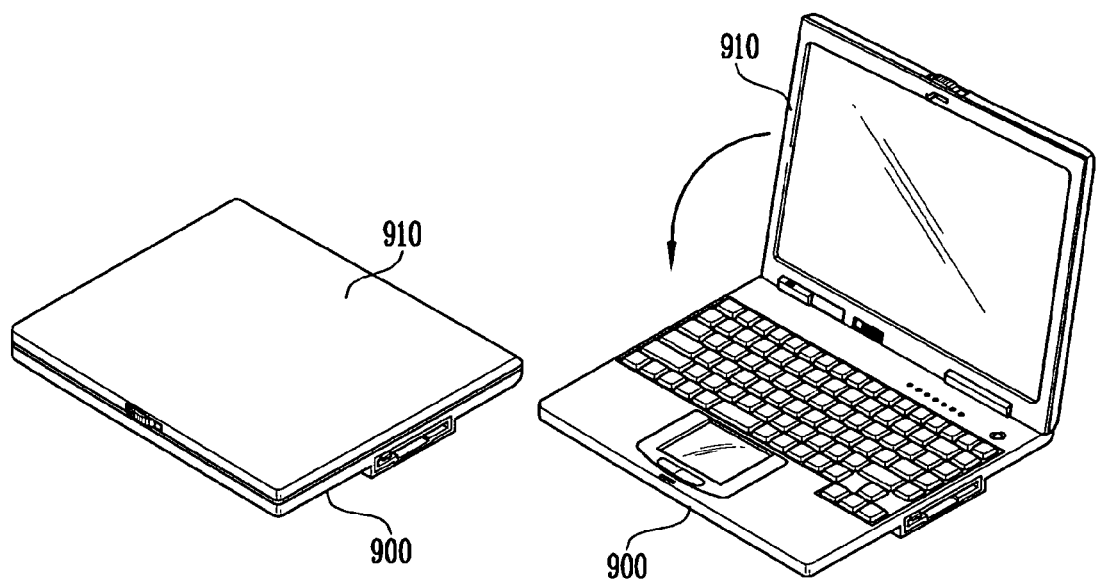
FIG. 1 illustrates a view of a laptop computer and a cover for the laptop computer.

Korean Patent Application No. 10-2010-0126947, filed on Dec. 13, 2010, in the Korean Intellectual Property Office, and entitled: "Display Device having Liquid Crystal Display Cover" is incorporated by reference herein in its entirety.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Since the present invention may be modified in various ways and have various embodiments, exemplary embodiments will be described in detail with reference to the accompanying drawings. However, it should be understood that the present invention is not limited to a specific embodiment but includes all changes and equivalent arrangements and substitutions included in the spirit and scope of the present invention. In the following description, if the detailed description of the already known structure and operation may confuse the subject matter, the detailed description thereof will be omitted.

FIG. 2 illustrates a view showing a configuration of a display device having a liquid crystal display cover according to an exemplary embodiment.

Referring to FIG. 2, the display device having the liquid crystal display cover may include a main display unit 1 and a liquid crystal display cover 2.

The main display unit 1 may be installed in a portable electronic device such as a laptop computer, a tablet PC, etc. The main display unit 1 may be configured to display an image and to be protected by the liquid crystal display cover 2. The liquid crystal display cover 2 may be positioned at an upper side of the display device.

The main display unit 1 may be a flat panel display such as a liquid crystal display (LCD), a field emission display (FED), a plasma display panel (PDP), and an organic light emitting display (OLED), preferably a LCD.

The liquid crystal display cover 2 may be coupled to the main display unit 1 to be open and closed. For example, the liquid crystal display cover 2 may be configured to move in a first direction to have an open configuration, e.g., an open relationship with respect to the main display unit 1, and may be configured to move in a second direction to have a closed configuration, e.g., a closed relationship with respect to the main display unit 1.

Figure 2A:
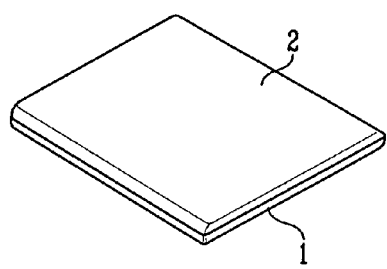
FIGS. 2A, 2B, 2C, and 2D illustrate various views of a configuration of a display device having a liquid crystal display cover, according to an exemplary embodiment.

FIG. 2A illustrates a view of a state that the liquid crystal display cover 2 is closed, i.e., is in a closed configuration, with respect to the main display unit 1. The liquid crystal display cover 2 may protect the main display unit 1 from, e.g., external shock, by maintaining a closed state as illustrated in FIG. 2A.

Figure 2B:
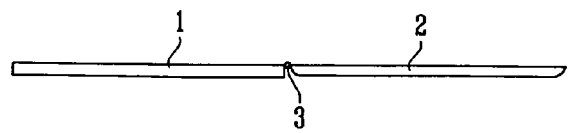
Figure 2C:
Figure 2D:
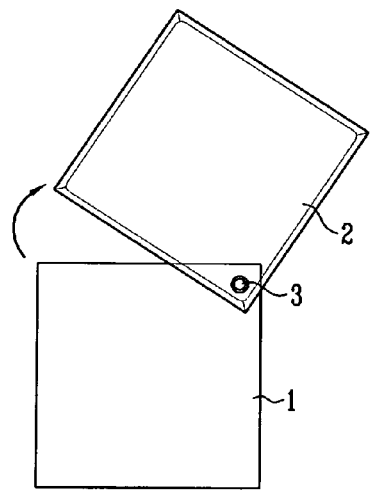

FIGS. 2B, 2C, and 2D illustrate embodiments of exemplary coupling structures of the main display unit 1 and the liquid crystal display cover 2.

As illustrated in FIG. 2B, the main display unit 1 and the liquid crystal display cover 2 may have a folding structure. The folding structure may be implemented by a pivot unit 3 for coupling an end of the main display unit 1 with an end of the liquid crystal display cover 2 in a hinge structure.

As illustrated in FIG. 2C, the main display unit 1 and the liquid crystal display cover 2 may have a sliding structure. Therefore, the liquid crystal display cover 2 may slide on the main display unit 1 toward a side thereof to be opened and closed.

Particularly, as illustrated in FIG. 2D, the pivot unit 3 may be installed to horizontally pivot the liquid crystal display cover 2. The pivot unit 3 may protrude, e.g., in an upward direction, from the main display unit 1. The pivot unit 3 may be coupled with the liquid crystal display cover 2. The pivot unit 3 may be installed in an outer region such as a corner of the main display unit 1. Therefore, the liquid crystal display cover 2 may horizontally pivot so that, e.g., an aesthetically pleasing feature can be provided.

Figure 3:
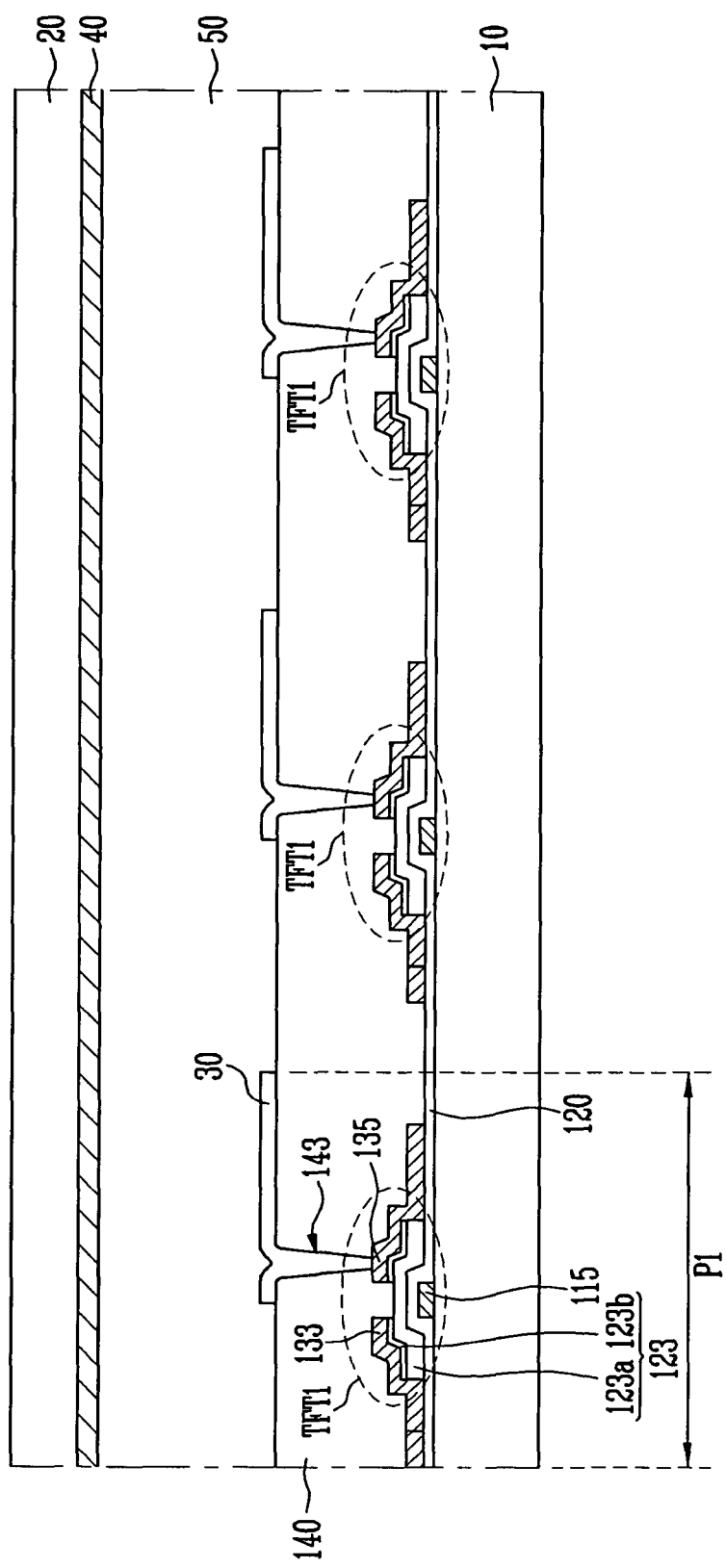
FIG. 3 illustrates a sectional view of the liquid crystal display cover, according to an exemplary embodiment.

FIG. 3 illustrates a sectional view of the liquid crystal display cover 2 according to the exemplary embodiment. Referring to FIG. 3, the liquid crystal display cover 2 may include a lower substrate 10, an upper substrate 20, and a liquid crystal layer 50 disposed between the lower substrate 10 and the upper substrate 20.

The lower substrate 10 and the upper substrate 20 may be transparent substrates made of insulating material. For example, the lower substrate 10 and the upper substrate 20 may be made of at least one of glass, plastic, silicon, and synthetic resin. The lower substrate 10 and the upper substrate 20 may face each other.

A plurality of first pixel electrodes 30 may be arranged at a predetermined interval on the lower substrate 10. Each pixel P1 may include a first thin film transistor TFT1 and a first pixel electrode 30.

The first thin film transistor TFT1 may include a gate electrode 115, a first electrode 133, e.g., a source electrode, a second electrode 135, e.g., a drain electrode, and a semiconductor layer 123 formed between the gate electrode 115 and the first and second electrodes 133 and 135. The semiconductor layer 123 may include an active layer 123a and an ohmic contact layer 123b. However, embodiments of the structure of the first thin film transistor TFT1 are not limited thereto.

A gate insulating layer 120 may be formed on the gate electrode 115. A protecting layer 140 may be formed above between the first and second electrodes 133 and 135. The protecting layer 140 may include a contact hole 143 for exposing the second electrode 135.

The first pixel electrode 30 may be formed on the protecting layer 140. The first pixel electrode 30 may be coupled to the second electrode 135 through the contact hole 143 in the protecting layer 140.

Therefore, according to an exemplary embodiment, a predetermined voltage applied from the first electrode 133 may be transmitted to the second electrode 135 through the first thin film transistor TFT1 or may be cut off so that each pixel P1 can be controlled to display white and black.

A first common electrode 40 may be formed under the upper substrate 20. The first common electrode 40 may be applied with a predetermined common voltage and may form a predetermined electric field in association with the respective first pixel electrodes 30.

The first pixel electrode 30 and the first common electrode 40 may be made of transparent conductive material. For example, the first pixel electrode 30 and the first common electrode 40 may be made of at least one of indium tin oxide (ITO), indium zinc oxide (IZO), like materials, and etc.

The liquid crystal layer 50 may be disposed between the lower substrate 10 and the upper substrate 20. The liquid crystal layer 50 may be arranged by the electric field generated by the first pixel electrode 30 and the first common electrode 40. The liquid crystal layer 50 may be disposed directly between the first pixel electrode 30 and the first common electrode 40.

The liquid crystal layer 50 may be a polymer dispersed liquid crystal layer in a light scattering mode in which liquid crystals are scattered in transparent polymer resin, such as polymer dispersed liquid crystal (PDLC) or polymer network liquid crystal (PNLC).

PDLC may be made in such a way that liquid crystal material is made by dispersing liquid crystals in Arabian rubber or polyvinyl alcohol solution. For example, the liquid crystal material may be coated, e.g., uniformly, on glass or a polyester film substrate coated with conductive material indium tin oxide (ITO) by a thickness of about 5 to 20 micrometers and water is evaporated, and then a glass or polyester film substrate on which ITO is coated is bonded thereon, or by phase separation using solubility of polymer and liquid crystal monomer. In such PDLC, polymer may be continuous phase and liquid crystals form droplets.

PNLC has a three dimensional net-shaped structure. In the PNLC, liquid crystals may be continuous phase and polymer may be cross linked. The PNLC may exhibit low driving voltage that is lower than PDLC due to, e.g., refraction dependence of liquid crystal and polymer lower than PDLC.

In the polymer dispersed liquid crystal layer, monomer liquid crystals may be arranged in a polymer matrix randomly in zero electric field, and light dispersion caused by difference of refraction between the liquid crystal and polymer matrix may cause opacity. When a voltage is applied, the liquid crystals may be arranged in the direction of the electric field, e.g., formed by the applied voltage, and refractive indexes of the liquid crystals and the polymer matrix may be the same so that the polymer dispersed liquid crystal layer is transparent to allow light to transmit.

Figure 6:
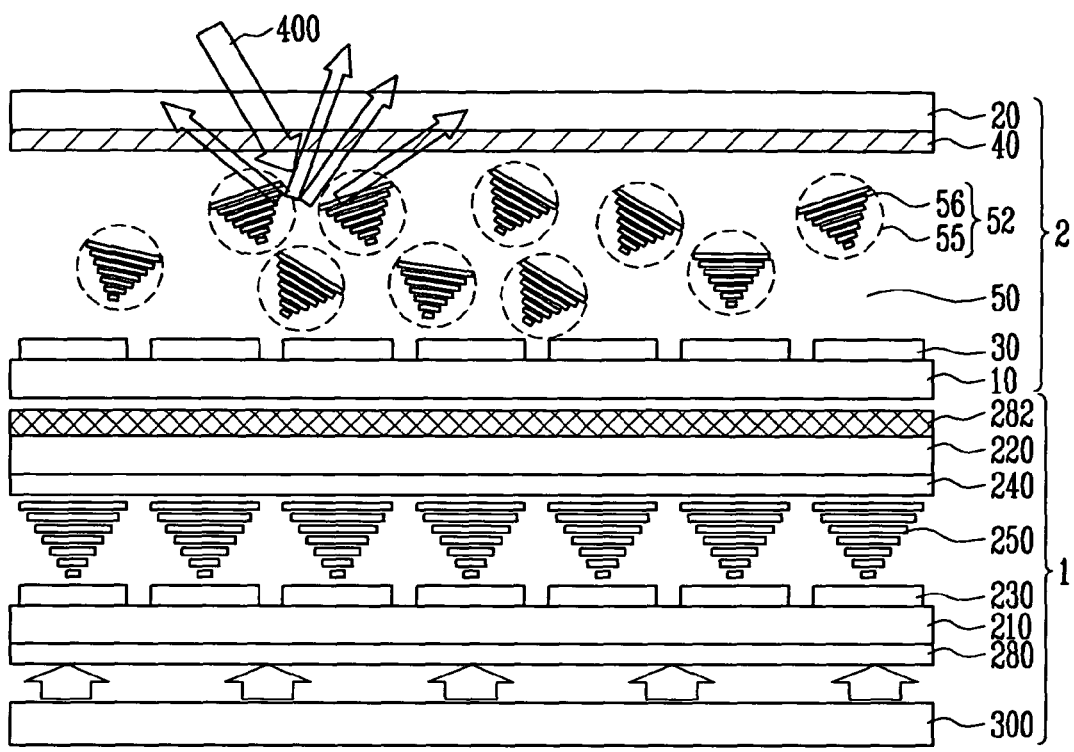
FIG. 6 illustrates a sectional view showing an operation of the liquid crystal display cover including a liquid crystal layer of a liquid crystal microcapsule, according to an exemplary embodiment.

The liquid crystal layer 50, e.g., as illustrated in FIG. 6, may be a liquid crystal layer including a plurality of liquid crystal micro-capsules 52. Each of the liquid crystal micro-capsules 52 may include a transparent film 55 and liquid crystal material 56 inserted into the transparent film 55. Each of the liquid crystal micro-capsules 52 may have a diameter of about 0.2 micrometers to about 80 micrometers. The liquid crystal micro-capsules 52 may serve to perform dispersion and transmission like the polymer dispersed liquid crystal layer.

Figure 4:
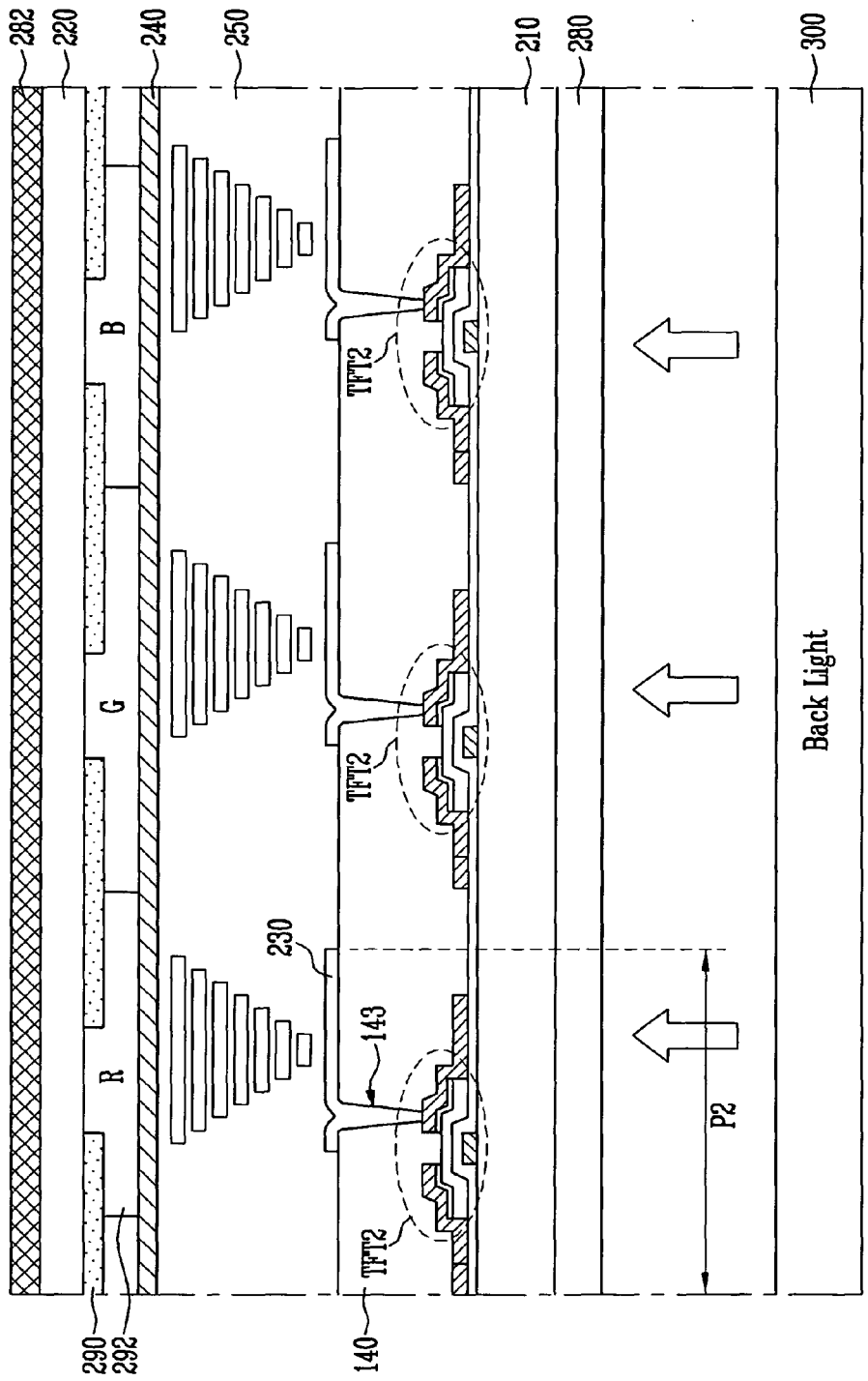
FIG. 4 illustrates a sectional view of a main display unit, according to an exemplary embodiment.

FIG. 4 illustrates a sectional view of the main display unit 1 according to an exemplary embodiment. The main display unit 1 according to the embodiment may be a liquid crystal display device.

Referring to FIG. 4, the liquid crystal display device, that is, the main display unit 1 may include a first substrate 210 on which a plurality of pixels P2 are formed, a second substrate 220 facing to the first substrate 210, and a liquid crystal layer 250 disposed between the first substrate 210 and the second substrate 220. The main display unit 1 may include first and second polarizers 280 and 282 formed on outer surfaces of the first and second substrates 210 and 220, respectively. The main display unit 1 may include a backlight 300 positioned under the first substrate 210 to provide light for displaying an image.

Each of the pixels P2 formed on the substrate 210 may include a second thin film transistor TFT2 and a second pixel electrode 230. The second thin film transistor TFT2 and the second pixel electrode 230 may be the same as or similar to those of the liquid crystal display cover 2, as such the detailed description will be omitted.

On the rear surface of the second substrate 220, a grid shaped black matrix 290 may be formed. The grid shaped black matrix 290 may be for surrounding regions of the respective pixels P2 to cover non-displaying regions of gate lines, data lines, and the second thin film transistor TFT2, red-, green-, and blue-color filter patterns 292 sequentially and repeatedly arranged in response to the respective pixels P2 in the black matrix 290, and a second transparent common electrode 240 made of transparent conductive material (for example, ITO) under the color filter patterns 292. An overcoat layer (not shown) may be further formed between the color filter patterns 292 and the second common electrode 240.

The liquid crystal layer 250 may be arranged by the electric field generated by the second common electrode 240 and the respective second pixels 230 and may display various types of images by transmitting light provided from the back light 300.

The liquid crystal layer 250 may be a normally white mode for displaying white in a state where the electric field is not applied. This is why only the back light 300 may be turned on to be used as a light source of the liquid crystal display cover 2 in the state where the liquid crystal display cover 2 covers the main display unit 1. Therefore, the liquid crystal display cover 2 can be used at night.

Figure 5A:
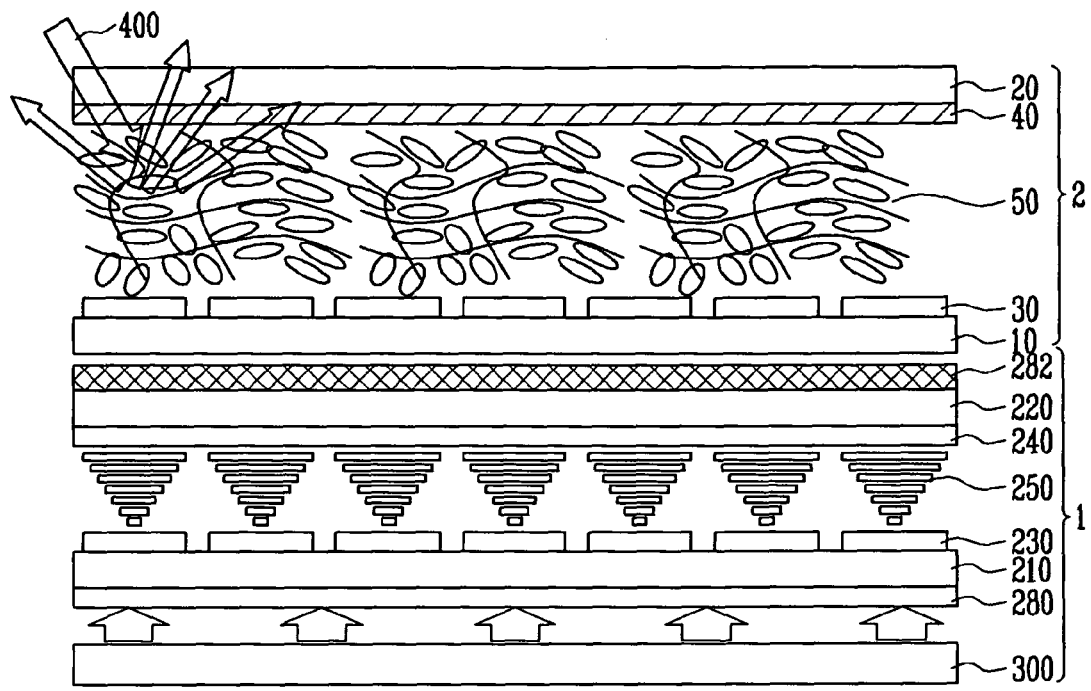
FIGS. 5A and 5B illustrate various views of an operation of a liquid crystal display cover having a polymer dispersed liquid crystal layer, according to an exemplary embodiment.
Figure 5B:
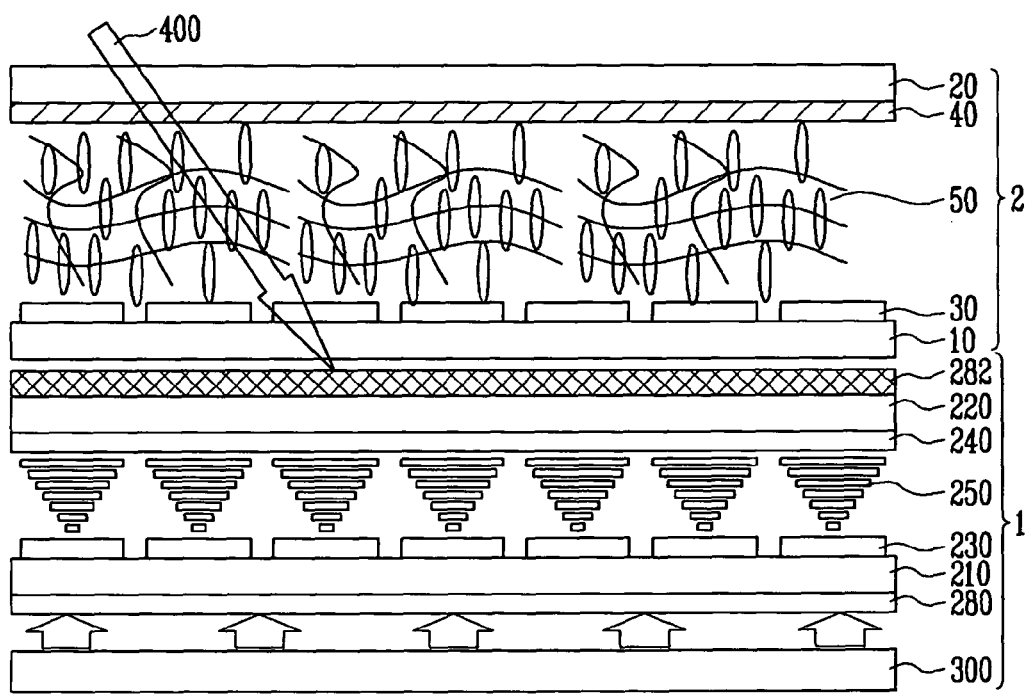

FIGS. 5A and 5B illustrate operations of the liquid crystal display cover 2 having the polymer dispersed liquid crystal layer, particularly a PNCL as the polymer dispersed liquid crystal layer, according to an exemplary embodiment.

FIG. 5A shows the liquid crystal layer 50 of the liquid crystal display cover 2 may be opaque because the electric field is not generated yet in the liquid crystal layer 50. Therefore, an external light 400 that enters from the outside may be dispersed in the liquid crystal layer 50 and may be reflected to the outside again. Accordingly, at this time white may be displayed.

FIG. 5B shows the liquid crystal layer 50 of the liquid crystal display cover 2 is transparent by the electric field generated in the liquid crystal layer 50. The liquid crystals are arranged by the generated electric field so that the external light 400 may be transmitted through the liquid crystal layer 50.

That is, the liquid crystal layer 50 may become transparent so that a user may see an image displayed on the main display unit 1, e.g., in an outdoor environment, even when the liquid crystal display cover 2 covers the main display unit 1. In other words, the image displayed on the main display unit 1 may be seen without opening the liquid crystal display cover 2.

According to an exemplary embodiment, since the second polarizer 282 may be formed above the main display unit 1, the external light 400 that enters from the outside may be absorbed by the second polarizer 282 and black may be displayed. Therefore, since the respective pixels P1 of the liquid crystal display cover 2 may display black and white, the liquid crystal display cover 2 may display various functions such as a keypad.

FIG. 6 illustrates a sectional view of operation of the liquid crystal display cover 2 including a liquid crystal layer of a liquid crystal microcapsule.

FIG. 6 illustrates a case where the electric field is not applied to the liquid crystal layer 50 including liquid crystal microcapsules 52. Therefore, the liquid crystal microcapsules 52 may be arranged at random in the liquid crystal layer 50. Thus, the external light 400 may be dispersed as illustrated in FIG. 5A and may be reflected to the outside environment again so that white is displayed.

When the electric field is applied to the liquid crystal layer 50 having the liquid crystal microcapsules 52, the respective liquid crystal microcapsules 52 may be arranged by the electric field such that the external light 400 may be transmitted toward the second polarizer 282. Therefore, black may be displayed as illustrated in FIG. 5B and a user may see the image displayed on the main display unit 1 without opening the liquid crystal display cover 2.

Figure 7A:
FIGS. 7A and 7B illustrate views of second polarizers, according to exemplary embodiments.
Figure 7B:

FIG. 7 illustrates a view of a second polarizer according to exemplary embodiments. FIG. 7A illustrates the second polarizer 282 on which an anti-reflection (AR) layer 500 may be laminated, and FIG. 7B illustrates the second polarizer 282 on which an anti-glare (AG) layer 510 is laminated.

Referring to FIG. 7, the second polarizer 282 according to the exemplary embodiment may include an AR layer 500 or an AG layer 510 formed thereon to, e.g., reduce surface reflection of the external light 400 transmitting the liquid crystal layer 50 when the electric field is generated in the liquid crystal layer 50.

The AR layer 500 may be made by laminating materials of different refractive indexes. According to an exemplary embodiment, the AR layer 500 may have a laminated structure including $TiO_2$ of high refractive index and $SiO_2$ of low refractive index.

The AR layer 510 may disperse and reflect the external light 400 due to unevenness formed on the surface. The AR layer 510 may be made by, e.g., scattering silicon particles on the second polarizer 282 and covering silicon resin thereon.

Figure 8:
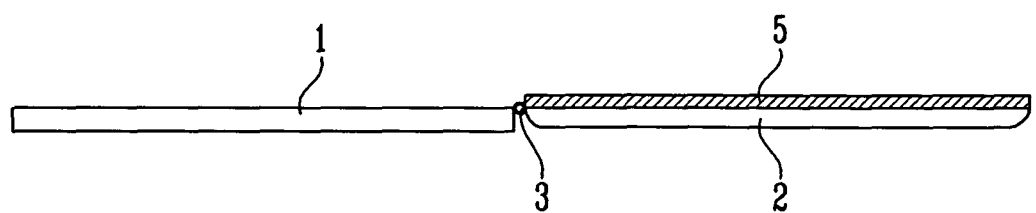
FIG. 8 illustrates a view of a display device having a liquid crystal display cover in which a touch screen unit is installed, according to an exemplary embodiment.

FIG. 8 illustrates a view of a display device having a liquid crystal display cover in which a touch screen unit is installed, according to an exemplary embodiment.

Referring to FIG. 8, a display device having the liquid crystal display cover according to the exemplary embodiment may further include a touch screen unit 5 attached to a side of the liquid crystal display cover 2.

The touch screen unit 5 may be a resistive touch screen, a light sensitive touch screen, and/or a capacitive touch screen. The touch screen unit 5, as illustrated in FIG. 8, may be installed to an inner surface or an outer surface of the liquid crystal display cover 2.

According to an exemplary embodiment, a user may input desired texts using the touch screen unit 5 installed in the liquid crystal display cover 2 without preparing a separated input device. Particularly, when a keypad is displayed on the liquid crystal display cover 2, a user can input desires texts more easily.

By way of summation and review, portable electronic devices may include a cover for, e.g., damping an external shock. For example, a laptop computer as illustrated in FIG. 1 may include a main body 900 in which a keypad is installed and a cover 910 pivotally coupled with an end of the main body 900.

The cover 910 of the laptop computer may serve only to protect the main body 900 from external shock by covering the main body 900. A user cannot see an image displayed on a display of the laptop computer unless the cover 910 is open. The embodiments disclosed herein advance the art by providing a display device having a liquid crystal display cover for protecting the display device from external shock and for allowing a user to see an image that is displayed on a main display without opening the cover.

Exemplary embodiments have been disclosed herein, and although specific terms are employed, they are used and are to be interpreted in a generic and descriptive sense only and not for purpose of limitation. Accordingly, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device with a liquid crystal display cover, the display device comprising:
   a main display unit; and
   a liquid crystal display cover coupled with the main display unit and being movable between open and closed positions with respect to the main display unit such that a surface of the liquid crystal display cover faces and is parallel with an image display surface of the main display unit in the closed position;
   wherein the liquid crystal display cover includes:
      a lower substrate with a plurality of first pixels thereon;
      an upper substrate facing the lower substrate and having a first common electrode thereon; and
      a liquid crystal layer between the lower substrate and the upper substrate; and
   further wherein:
      the liquid crystal display cover is transparent when liquid crystals in the liquid crystal layer thereof are aligned by an electric field, and
      the image display surface of the main display unit is visible through the transparent liquid crystal display cover when the liquid crystals in the liquid crystal layer of the liquid crystal display cover are aligned by the electric field and the liquid crystal display cover is in the closed position.

2. The display device as claimed in claim 1, wherein the liquid crystal layer is a polymer dispersed liquid crystal layer.

3. The display device as claimed in claim 1, wherein the liquid crystal layer includes a liquid crystal microcapsule.

4. The display device as claimed in claim 3, wherein the microcapsule has a diameter of about 0.2 micrometers to about 80 micrometers.

5. The display device as claimed in claim 1, wherein the main display unit is a liquid crystal display on which a polarizer is installed in a normally white mode.

6. The display device as claimed in claim 5, wherein the polarizer includes an anti-reflection (AR) layer or an anti-glare (AG) layer thereon.

7. The display device as claimed in claim 1, further comprising a touch screen unit attached to a side of the liquid crystal display cover.

8. The display device as claimed in claim 1, further comprising a pivot unit for connecting the main display to the liquid crystal display cover and for allowing the liquid crystal display cover to pivot.

* * * * *